(12) United States Patent
Zahradnik et al.

(10) Patent No.: US 11,098,067 B2
(45) Date of Patent: Aug. 24, 2021

(54) METHOD OF 4-BORONOPHENYLALANINE PRODUCTION

(71) Applicant: OTSUKA PHARMACEUTICAL CO., LTD., Tokyo (JP)

(72) Inventors: Petr Zahradnik, Chomutov (CZ); Antonin Sturc, Prague (CZ); Jiri Malinak, Jesenice (CZ); Jan Koci, Prelouc (CZ)

(73) Assignee: OTSUKA PHARMACEUTICAL CO., LTD., Tokyo (JP)

( * ) Notice: Subject to any disclaimer, the term of this patent is extended or adjusted under 35 U.S.C. 154(b) by 0 days.

(21) Appl. No.: 16/971,275

(22) PCT Filed: Feb. 19, 2019

(86) PCT No.: PCT/JP2019/005984
§ 371 (c)(1),
(2) Date: Aug. 19, 2020

(87) PCT Pub. No.: WO2019/163738
PCT Pub. Date: Aug. 29, 2019

(65) Prior Publication Data
US 2020/0392163 A1 Dec. 17, 2020

Related U.S. Application Data

(60) Provisional application No. 62/632,862, filed on Feb. 20, 2018.

(51) Int. Cl.
*C07F 5/02* (2006.01)
(52) U.S. Cl.
CPC .................................. *C07F 5/027* (2013.01)
(58) Field of Classification Search
CPC ....................................................... C07F 5/027
See application file for complete search history.

(56) References Cited

U.S. PATENT DOCUMENTS 10,323,046 B2 * 6/2019 Li ........................... C07B 47/00
2018/0155368 A1 6/2018 Li et al.

FOREIGN PATENT DOCUMENTS

| CN | 104961756 | 10/2015 |
| EP | 2865682 | 10/2016 |
| WO | 2017/028751 | 2/2017 |

OTHER PUBLICATIONS

Hiroyuki Nakamura et al., "A Practical Method for the Synthesis of Enantiomerically Pure 4-Borono-L-phenylalanine", Bulletin of the Chemical Society of J, Chemical Society of Japan, Tokyo, JP, vol. 73, No. 1, Jan. 1, 2000 (Jan. 1, 2000), pp. 231-235, XP008166752.
Database WPI Week 201629 Thomson Scientific, London, GB; AN 2015-708031 XP002790804, CN 104961756 A, (2015).
M. T. Reetz et al., "Non-Racemiping Synthesis and Stereoselective Reduction of Chiral a-Amino Ketones," Tetrahedron Asymmetry vol. 1 No. 6, pp. 375-378, 1990.
International Search Report issued for PCT/JP2019/005984, dated May 6, 2019, 4 pages.
International Preliminary Report on Patentability issued for PCT/JP2019/005984, dated Aug. 27, 2020, 7 pages.

* cited by examiner

*Primary Examiner* — Brian J Davis
(74) *Attorney, Agent, or Firm* — Hamre, Schumann, Mueller & Larson, P.C.

(57) ABSTRACT

The present invention relates to a method of production of 4-boronophenylalanine (BPA) from 4-iodophenylalanine, in which all the functional groups of the amino acid are protected by benzyl protection method, and which uses isopropyl magnesium halogenide stabilized by a complexation base, and subsequent condensation of the resulting Grignard reagent with a boric acid ester. The final reaction step, catalytic hydrogenolysis or transfer hydrogenolysis of protecting groups on the amino acid, occurs after hydrolysis of the boronate ester groups.

19 Claims, No Drawings

METHOD OF 4-BORONOPHENYLALANINE PRODUCTION

TECHNICAL FIELD

The invention concerns the method of production of 4-boronophenylalanine (BPA), particularly the product containing the $^{10}B$ isotope and L-phenylalanine configuration. The compounds are already known; the derivatives containing the $^{10}B$ isotope have been used as drugs in tumor treatment in the so-called boron neutron capture therapy (BNCT).

BACKGROUND ART

4-Boronophenylalanine (BPA) is a boronated amino acid with a specific affinity to tumors. BPA with the $^{10}B$ isotope is a clinically used compound for BNCT, wherein tumor cells degrade following neutrons irradiation.

In pursuit of a practicable synthesis process of 4-boronophenylalanine, some approaches utilizing organometallic intermediates have been published.

Kuen-Wang et al., EP 2865682 B1 disclose a process to synthesize 4-borono-phenylalanine by reacting N-protected 4-halophenylalanine, a boronating agent and an organolithium.

Li et al., WO 2017/028751 disclose a process to synthesize 4-borono-phenylalanine by reacting N-protected 4-halophenylalanine, a boronating agent, a Grignard reagent, and bis(2-methyl-aminoethyl) ether. The method is characterized by using a simple procedure without complicated multistep processes.

SUMMARY OF INVENTION

Technical Problem

The main purpose of the present invention is to synthesize 4-borono-phenylalanine with significant technological advantages, such as working under mild reaction conditions, savings of reagents and catalysts, minimum quantity of by-products and a substantial reduction of purification necessary to obtain a product for pharmaceutical purposes.

Solution to Problem

When exploring the boronation in the given reactions with a Grignard reagent, the present inventors surprisingly discovered better conditions of the boronation in combination with protection of all functional groups. Conditions for synthesis of the boronic acid after protecting all the functional groups of the amino acid and finally also conditions for catalytic removal of the protecting groups in the amino acid configuration have been found.

The present invention mainly is mentioned below.
(Term 1)
A method for production of 4-boronophenylalanine from 4-iodophenylalanine, characterized in that
in the first reaction step, the carboxy functional group of 4-iodophenylalanine is protected as benzyl ester and the amino group of 4-iodophenylalanine is protected as dibenzyl or benzyloxycarbonyl derivative, and then the iodine in the resulting protected 4-iodophenylalanine is substituted with magnesium halogenide by means of a reaction with isopropyl magnesium halogenide stabilized with a complexation base to obtain 4-magnesium halogenide of the protected phenylalanine,
in the second reaction step, 4-magnesium halogenide of the protected phenylalanine obtained in the first reaction step is substituted with boric acid ester of the general formula $B(OR)_3$, where R is aliphatic alkyl with the number of carbon atoms from 1 to 10, phenyl, or benzyl, and the resulting boronic ester group is hydrolyzed to obtain protected 4-boronophenylalanine, and
in the third reaction step, the protected 4-boronophenylalanine obtained in the second reaction step is deprotected by catalytic hydrogenolysis or transfer hydrogenolysis with Pd catalyst and the reaction mixture is then precipitated with bases to obtain 4-boronophenylalanine.
(Term 2)
The method according to Term 1, wherein
in the first reaction step, the protected 4-iodophenylalanine reacts with isopropyl magnesium halogenide stabilized with a complexation base, where the halogenide is chloride or bromide, and the complexation base is selected from the group consisting of bis[2-(N,N-dimethylamino)ethyl] ether, N,N,N',N'-tetramethylenediamine, 1,4-diazabicyclo[2,2,2]octane, N-methylmorpholine and N,N,N',N',N'-pentamethyldiethylenetriamine, at the temperature of −20 to 20° C. in ethereal medium, at the molar ratio of isopropyl magnesium halogenide to the protected 4-iodophenylalanine of 1 to 1.5, to obtain 4-magnesium halogenide of the protected phenylalanine,
in the second reaction step, the 4-magnesium halogenide is substituted with boric acid ester at the temperature of −70 to 0° C. and at the molar ratio of the boric acid ester to the 4-magnesium halogenide of the protected phenylalanine of 1 to 2, the resulting boronic ester group is subsequently hydrolyzed in an aqueous acid medium at the temperature of 0 to 50° C. to obtain the protected 4-boronophenylalanine, and
in the third reaction step, the catalytic hydrogenolysis cleavage of the protecting groups is performed at the hydrogen pressure of 0.1 to 10 MPa and at the temperature of 15 to 120° C., in the aqueous alcohol medium, in the presence of an organic or inorganic acid, by means of Pd catalyst in the amount of 1 to 150 wt. %, based on the protected 4-boronophenylalanine, and the reaction mixture is precipitated by bases to pH 5 to 8 at the temperature of 0 to 50° C. to obtain 4-boronophenylalanine.
Alternatively, the transfer hydrogenation is performed when donor of hydrogen is used instead of hydrogen gas.
(Term 3)
The method according to Term 1 or 2, wherein the complexation base in the first reaction step is bis[2-(N,N-dimethylamino)ethyl] ether.
(Term 4)
The method according to any one of Terms 1 to 3, wherein the substitution reaction in the first reaction step is performed at temperatures of −5 to 5° C. in tetrahydrofuran medium, at the molar ratio of isopropyl magnesium halogenide to protected 4-iodophenylalanine of 1.2.
(Term 5)
The method according to any one of Terms 1 to 4, wherein the boric acid ester used in the second reaction step is methyl or ethyl ester and the reaction is performed at the temperature of −25 to −15° C.
(Term 6)
The method according to any one of Terms 1 to 5, wherein the ratio of the boric acid ester to 4-magnesium halogenide of the protected phenylalanine in the second reaction step is 1.5.

(Term 7)

The method according to any one of Terms 1 to 6, wherein the aqueous acid medium in the second reaction step is 3 to 5 M hydrochloric acid at the temperature of 5 to 25° C.

(Term 8)

The method according to any one of Terms 1 to 7, wherein the catalytic hydrogenolysis cleavage is performed, wherein the Pd catalyst is Pd on carbon in the quantity of 1 to 10 wt. %, based on the protected 4-boronophenylalanine, at the temperature of 30 to 70° C. and at hydrogen pressure of 0.5 to 2 MPa.

(Term 9)

The method according to any one of Terms 1 to 8, wherein the transfer hydrogenolysis in the third reaction step is performed preferably using Pd on silica (Pd content 20%) in the quantity of 20 to 50 wt. %, with addition of formic acid using preferably 7 to 15% of molar excess at 50 to 70° C.

(Term 10)

The method according to any one of Terms 1 to 9, wherein the deprotection in the third reaction step is performed in reaction medium of aqueous ethanol with water content 20 to 50 vol. %, in the presence of hydrochloric acid in the quantity of 0.5 to 3, preferably 1 to 2 molar equivalents HCl, based on the protected 4-boronophenylalanine.

(Term 11)

The method according to any one of Terms 1 to 10, wherein the precipitation in the third reaction step is performed at pH 6 to 7 at the temperature of 5 to 15° C. by means of NaOH or KOH.

(Term 12)

The method according to any one of Terms 1-11, wherein the second reaction step is followed by an additional purification of the produced 4-boronophenylalanine by means of extraction with ester solvents, particularly ethyl acetate, and washing with sodium hydrogencarbonate solution and water and, if needed, additionally purified with active carbon, to obtain purified protected 4-boronophenylalanine.

(Term 13)

The method according to any one of Terms 1 to 12, wherein said method is carried out with an L-configuration of phenylalanine and/or with boron compounds enriched with the $^{10}$B isotope.

(Term 14)

A 4-magnesiumhalogenide of the protected phenylalanine of formula 2:

[Chem. 1]

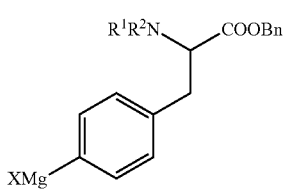

where $R^1$ and $R^2$ are benzyl, or $R^1$ is benzyloxycarbonyl, $R^2$ is H; Bn is benzyl; X is Cl or Br as an intermediate product in the production of 4-boronophenylalanine.

(Term 15)

A protected 4-boronophenylalanine of formula 3:

[Chem. 2]

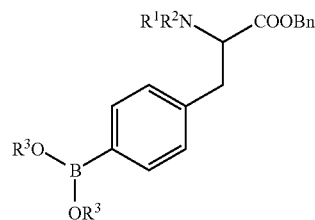

where $R^1$ and $R^2$ are benzyl, or $R^1$ is benzyloxycarbonyl, $R^2$ is H; Bn is benzyl; $R^3$ is C1 to C10 alkyl, phenyl, or benzyl as an intermediate product in the production of 4 boronophenylalanine.

Effect of Invention

The described reaction sequence, according to the invention as a whole, brings about significant technological advantages, such as working under mild reaction conditions, savings of reagents and catalysts, minimum quantity of by-products and a substantial reduction of purification necessary to obtain a product for pharmaceutical purposes. The product is obtained at high yields.

DESCRIPTION OF EMBODIMENTS

Before performing the method according to the invention, it is necessary to sufficiently protect functional groups of 4-iodophenylalanine, particularly sterically. The carboxyl group is protected as benzyl ester group, the amino group is protected as a dibenzyl (Bn) or benzyloxycarbonyl (Z) derivative, as shown in formula 1 of the protected 4-iodophenylalanine:

[Chem. 3]

where $R^1$ and $R^2$ are benzyl, or $R^1$ is benzyloxycarbonyl, $R^2$ is H; Bn is benzyl.

The protection of amino acid groups by benzylation has been known before: M. T. Reetz, Tetrahedron Asymmetry 1990, 1, (6), 375, H. Nakamura et al., Bull. Chem. Soc. Jpn., 2000, 73, 231.

When replacing iodine with an MgX group on the nucleus of the protected 4-iodophenylalanine 1, it is also necessary to select slightly cryogenic conditions, along with the use of a complexation agent for isopropyl magnesium halogenide (iPrMgX); the reaction produces 4-magnesium halogenide of protected phenylalanine of formula 2, which is, as an intermediate product, also a part of the invention.

[Chem. 4]

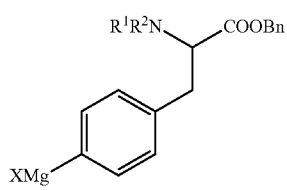

where R¹ and R² are benzyl, or R¹ is benzyloxycarbonyl, R² is H; Bn is benzyl; X is Cl or Br.

The reaction of the Grignard reagent 2 with boric acid esters needs to be performed at temperatures most preferably below −10° C. Similarly as the above-mentioned Grignard reagent 2, the esters of boronic acid (boronates) of the following formula 3 have not been described either:

[Chem. 5]

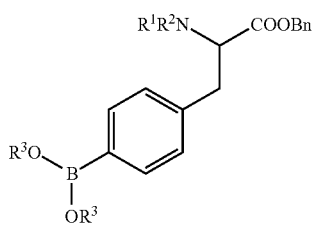

where R¹ and R² are benzyl, or R¹ is benzyloxycarbonyl, R² is H; Bn is benzyl; R³ is C1 to C10 alkyl, phenyl, or benzyl.

These compounds are not isolated in the method of the invention. Ester bonds in the boronate 3 are hydrolyzed, by previously known methods, for example with concentrated acids, such as HCl, under laboratory conditions.

After obtaining boronic acid 4 (see, the Scheme 1 below) the protecting benzyl or benzyloxycarbonyl groups are removed on the amino acid, by catalytic hydrogenation or transfer hydrogenation on Pd catalysts under conditions usual for the catalysis, i.e. at the weight ratio of the catalyst to the substrate in units or tens of percent, in respect to the substrate. The high yields of 4-boronophenylalanine (BPA) 5 have been achieved, over 80%, and even in high purity.

Scheme 1

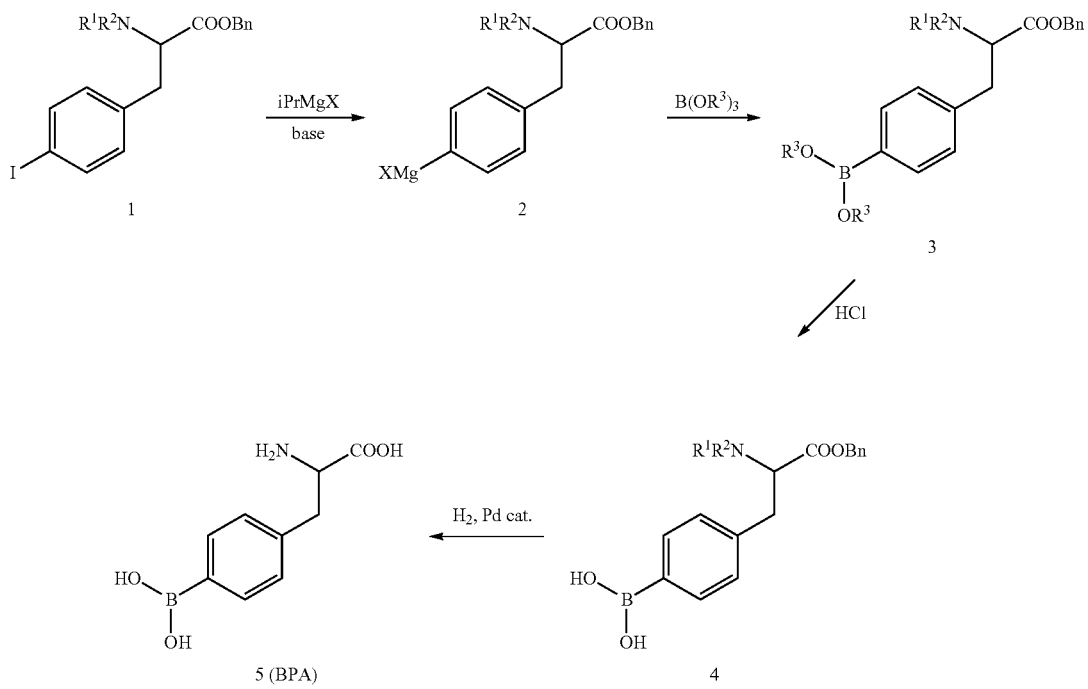

where R¹ and R² are benzyl, or R¹ is benzyloxycarbonyl, R² is H; Bn is benzyl; R³ is C1 to C10 alkyl, phenyl, or benzyl; X is Cl or Br.

The subject matter of the solution according to the invention is a method of production of 4-boronophenylalanine 5 from the protected 4-iodophenyalanine 1, in which the carboxyl functional group is protected as benzyl ester and the amino group is protected as a benzyloxycarbonyl or preferably dibenzyl derivative, where in the first reaction step, the iodine is replaced with magnesium halogenide in the protected 4-iodophenyalanine 1 by means of a reaction with isopropyl magnesium halogenide, stabilized with a complexation base, which produces 4-magnesium halogenide of the protected phenylalanine 2.

The halogen in isopropyl magnesium halogenide is chlorine or bromine, preferably chlorine. The complexation bases are, for example bis[2-(N,N-dimethylamino)ethyl] ether, TMEDA (N,N,N',N'-tetramethylethylenediamine), DABCO (1,4-diazabicyclo[2.2.2]octane), NMM (N-methylmorpholine), N,N,N',N',N'-pentamethyldiethylenetriamine, preferably bis[2-(N,N-dimethyl amino)ethyl] ether.

The reaction in the first reaction step is performed at temperatures −20 to 20° C., preferably at −5 to 5° C. in ethereal medium, preferably in tetrahydrofuran, at the molar ratios of iPrMgX to the substrate 1 to 1.5, preferably 1.2.

The substitution of the 4-magnesium halogenide group of the protected phenylalanine 2 in the second reaction step with a boronic group, which results in formation of the boronic ester derivative 3, is performed with esters of boric acid with the formula $B(OR)_3$, where R is an aliphatic alkyl with 1 to 10 carbon atoms, phenyl, or benzyl, preferably methyl or ethyl. The used temperatures are cryogenic, for example −70 to 0° C., preferably −25 to −15° C. The ratio of the boric acid ester to the substrate 2 is 1 to 2 molar, preferably 1.5.

In the second reaction step follows hydrolysis of ester groups at the boronic function of the compound 3, preferably without isolation, which uses preferably aqueous acids, preferably hydrochloric acid, in a concentration 3 to 5 mol/liter, at temperatures of 0 to 50° C., preferably 5 to 25° C. The crude product, protected 4-boronophenylalanine 4, is usually extracted with ester solvents, preferably with ethyl acetate, purified by washing with a solution of sodium hydrogencarbonate and water. If needed, it may be thoroughly purified, for example with activated carbon, and after its concentration it yields an oily product, purified protected 4-boronophenylalanin 4, or, in other words, phenylalanine 4-borono-N,N-dibenzyl (or benzyloxycarbonyl) benzyl ester in the yields up to 90% of theory.

In the third reaction step, the protecting groups benzyl and benzyloxycarbonyl are removed in the amino acid configuration of the protected 4-boronophenylalanine 4 obtained in the second reaction step, by means of catalytic hydrogenolysis or transfer hydrogenolysis. The catalysts are used containing Pd, for example Pearlman's catalyst, Pd on alumina, preferably Pd/C (Pd on activated carbon) or $Pd/SiO_2$ (Pd on silica). The content of Pd on the carriers is usually 1-20 wt. %. The quantity of the catalyst is determined by the purity of raw materials, required reaction rates and temperatures. Generally, it ranges from 1-150 wt. % based on the hydrogenated substance, however, the method of the invention preferably enables the use of only 1-10 wt. % and with the reaction time of only several hours. The debenzylation temperatures may be selected from 15 to 120° C., preferably 30-70° C. The hydrogen pressure ranges from 0.1 to 10 MPa, preferably the pressure should be higher than the atmospheric one, for example 0.5 to 2 MPa. The hydrogenolysis medium consists of alcohols, preferably aqueous, with water content 20 to 50 vol. %. The used medium is acidic with additions of inorganic acids (sulfuric, phosphoric, preferably hydrochloric), while it is possible to use also organic acids (acetic, methansulfonic, toluensulfonic, benzoic, trifluoroacetic). The acids are used in the amount of 0.5 to 3 molar equivalents based to the substrate, the protected 4-boronophenylalanine 4, preferably 1 to 2 molar equivalents.

Alternatively, the transfer hydrogenation can be used for the removal of protecting groups. The transfer hydrogenation is successfully performed using suitable hydrogen donors, preferably formic acid and Pd on silica as a catalyst is used.

Following the hydrogenolysis, the crude product, 4-boronophenylalanine 5, is prepared by precipitation with a base at pH 5 to 8, preferably 6 to 7, at the temperature of 0 to 50° C., preferably 5 to 15° C., while the preferred base is NaOH or KOH. The product does not have to be dried and it is preferably further purified for example by repeated precipitation from hydrochloride.

The method can be used both for racemic phenylalanine derivatives and for the D-form, L-form and for products to a various extent enriched with the $^{10}B$ isotope. The method according to the invention offers high yields of the final product, 80% when calculated to the precursor 1, low laboriousness of the process and thus high effectiveness of the production. The synthesis of the boronic acids 4 is performed in situ from the precursor 1 under usual conditions, in a short time and with the high selectivity, over 80%, and after the optimized hydrogenolysis it results in the final product, BPA 5.

EXAMPLES

Example 1:
4-Borono-N,N-dibenzyl-L-phenylalanine Benzyl Ester 4

685 g (1.146 mol) of 4-iodo-N,N-dibenzyl-L-phenylalanine hydrochloride benzyl ester 1 is dissolved in 800 ml dichloromethane and transformed into a base by extraction with 5% sodium hydrogencarbonate solution. The organic phase is, after its concentration, diluted with 540 ml of dried THF.

750 ml of THF and 260 ml of bis[2-(N,N-dimethylamino) ethyl] ether (1.38 mol) and 690 ml of 2 M THF solution of isopropyl magnesium chloride are charged into a 6-liter flask and stirred at the temperature of 10-15° C. for 30 minutes. The reaction mixture is then cooled down to 0° C. and 4-iodo-N,N-dibenzyl-L-phenylalanine benzyl ester solution in THF is added and the mixture is stirred at 0-5° C. until the reaction is completed based on HPLC. Subsequently, the reaction mixture is cooled to −20° C. and 190 ml of trimethylborate (1.72 mol) is added thereto. Over a period of 2 hours, the reaction mixture is warmed to the laboratory temperature and stirred for additional 2 hours. The reaction is completed with neutralization with 1400 ml of 4 M HCl. The extraction is performed with 680 ml of ethyl acetate, the organic phase is separated and washed with 550 ml of 5% sodium hydrogencarbonate solution and 2×400 ml of water. After the concentration, 580 g of 4-borono-N,N-dibenzyl-L-phenylalanine benzyl ester is obtained in form of a yellow oil.

Example 2: 4-Borono-L-phenylalanin 5, BPA

The concentrate containing 100.9 g (0.21 mol) of 4-borono-N,N-dibenzyl-L phenylalanine benzyl ester 4 is dissolved in 280 ml of ethanol, 43 ml of demineralized water and 37 ml of 35% HCl (0.42 mol) are added thereto, and the solution is placed into an autoclave. The hydrogenolysis is catalyzed by Pd/C (10 g, 5% Pd, 50% water) at the hydrogen pressure of 0.5-1.2 MPa and the temperatures up to 60° C. and the reaction is monitored with HPLC. After the reaction is completed, the catalyst is separated by filtration and the filtrate is precipitated with 30% aqueous solution of NaOH to pH 6-7. After cooling to 0 to 5° C., crystals of BPA are filtered off, with the yield 84% of theory. The subsequent purification is performed by precipitation with 30% aqueous solution of NaOH from hydrochloride solution. The obtained yield after purification is 91% and the HPLC purity is 99.0% with the content of L-phenylalanine less than 1%.

Example 3

To a solution of 4-borono-N,N-dibenzyl-L-phenylalanine benzyl ester 4 (4.3 g, 0.009 mol) in 25 ml of ethanol is added 1.2 g of catalyst Pd/SiO$_2$ (Pd content 20%, water content 55%). The mixture is heated to 50-70° C. and the solution of formic acid (4.5 ml) in 20 ml of ethanol is added within 15 min. The reaction mixture is stirred at 50-70° C. for 3 hrs and then cooled to room temperature. The catalyst is filtered off and at stirring and maintaining the temperature 5-15° C. the resulting solution is neutralized to pH=6-7 with sodium hydroxide. After cooling to 0 to 5° C., crystals of BPA are filtered off, with the yield 80% of theory.

INDUSTRIAL APPLICABILITY

The invention concerns a new method of production of 4-boronophenylalanine, particularly the product with the $^{10}$B isotope and with the configuration of L-phenylalanine, used in boron neutron capture therapy (BNCT) for treating tumors.

The new synthesis of 4-boronophenylalanine described, which uses the Grignard reaction in combination with benzyl protection of functional groups and optimized procedures for removal of protecting groups, is economically more advantageous, less laborious and it provides high yields. The described reaction sequence, according to the invention as a whole, brings about significant technological advantages, such as working under mild reaction conditions, savings of reagents and catalysts and minimum quantity of by-products. Overall isolated yield ranges between 70-80% and purity (99% HPLC) is suitable for pharmaceutical use.

The invention claimed is:

1. A method for production of 4-boronophenylalanine from 4-iodophenylalanine, comprising
    a first reaction step comprising substeps of protecting the carboxy functional group of 4-iodophenylalanine as a benzyl ester and protecting the amino group of 4-iodophenylalanine as a dibenzyl or benzyloxycarbonyl derivative, and then substituting the iodine in the resulting protected 4-iodophenylalanine with magnesium halogenide by reaction with isopropyl magnesium halogenide stabilized with a complexation base to obtain 4-magnesium halogenide of the protected phenylalanine,
    a second reaction step comprising substeps of substituting 4-magnesium halogenide of the protected phenylalanine obtained in the first reaction step with boric acid ester of the general formula B(OR)$_3$, where R is aliphatic alkyl with a number of carbon atoms from 1 to 10, phenyl, or benzyl, and hydrolyzing the resulting boronic ester group to obtain protected 4-boronophenylalanine, and
    a third reaction step comprising substeps of deprotecting the protected 4-boronophenylalanine obtained in the second reaction step by catalytic hydrogenolysis or transfer hydrogenolysis with Pd catalyst, and then precipitating the reaction mixture with one or more bases to obtain 4-boronophenylalanine.

2. The method according to claim 1, wherein
    in the first reaction step, the protected 4-iodophenylalanine reacts with isopropyl magnesium halogenide stabilized with a complexation base, where the halogenide is chloride or bromide, and the complexation base is selected from the group consisting of bis[2-(N,N-dimethylamino)ethyl] ether, N,N,N',N'-tetramethylenediamine, 1,4-diazabicyclo[2,2,2]octane, N-methylmorpholine and N,N,N',N',N'-pentamethyldiethylenetriamine, at a temperature in a range of −20 to 20° C. in ethereal medium, at a molar ratio of isopropyl magnesium halogenide to the protected 4-iodophenylalanine in a range of 1 to 1.5, to obtain the 4-magnesium halogenide of the protected phenylalanine,
    in the second reaction step, the 4-magnesium halogenide is substituted with boric acid ester at a temperature in a range of −70 to 0° C. and at a molar ratio of the boric acid ester to the 4-magnesium halogenide of the protected phenylalanine in a range of 1 to 2, and the resulting boronic ester group is subsequently hydrolyzed in an aqueous acid medium at a temperature in a range of 0 to 50° C. to obtain the protected 4-boronophenylalanine, and in the third reaction step, the catalytic hydrogenolysis cleavage of the protecting groups is performed at a hydrogen pressure in a range of 0.1 to 10 MPa and at a temperature in a range of 15 to 120° C., in the aqueous alcohol medium, in the presence of an organic or inorganic acid, with Pd catalyst in an amount in a range of 1 to 150 wt. %, based on the protected 4-boronophenylalanine, and the reaction mixture is precipitated by one or more bases to a pH in a range of 5 to 8 at a temperature in a range of 0 to 50° C. to obtain 4-boronophenylalanine.

3. The method according to claim 1, wherein the complexation base in the first reaction step is bis[2-(N,N-dimethylamino)ethyl] ether.

4. The method according to claim 1, wherein the substitution reaction in the first reaction step is performed at a temperature in a range of −5 to 5° C. in tetrahydrofuran medium, at a molar ratio of isopropyl magnesium halogenide to protected 4-iodophenylalanine of 1.2.

5. The method according to claim 1, wherein the boric acid ester used in the second reaction step is methyl or ethyl ester and the reaction is performed at a temperature in a range of −25 to −15° C.

6. The method according to claim 1, wherein the ratio of the boric acid ester to 4-magnesium halogenide of the protected phenylalanine in the second reaction step is 1.5.

7. The method according to claim 2, wherein the aqueous acid medium in the second reaction step is 3 to 5 M hydrochloric acid at the temperature in a range of 5 to 25° C.

8. The method according to claim 1, wherein the catalytic hydrogenolysis cleavage is performed, wherein the Pd catalyst is Pd on carbon in a quantity in a range of 1 to 10 wt. %, based on the protected 4-boronophenylalanine, at a temperature in a range of 30 to 70° C. and at hydrogen pressure in a range of 0.5 to 2 MPa.

9. The method according to claim 1, wherein the transfer hydrogenolysis in the third reaction step is performed using Pd on silica (Pd content 20%) in a quantity in a range of 20 to 50 wt. %, based on the protected 4-boronophenylalanine, with addition of formic acid at a temperature in a range of 50 to 70° C.

10. The method according to claim 1, wherein the deprotection in the third reaction step is performed in reaction medium of aqueous ethanol with water content in a range of 20 to 50 vol. %, in the presence of hydrochloric acid in a quantity in a range of 0.5 to 3 molar equivalents HCl, based on the protected 4-boronophenylalanine.

11. The method according to claim 1, wherein the precipitation in the third reaction step is performed at pH in a range of 6 to 7 at a temperature in a range of 5 to 15° C. with NaOH or KOH.

12. The method according to claim 1, wherein the second reaction step is followed by an additional purification of the produced protected 4-boronophenylalanine by extraction with one or more ester solvents, and washing with sodium hydrogencarbonate solution and water to obtain purified protected 4-boronophenylalanine.

13. The method according to claim 1, wherein said method is carried out with an L-configuration of phenylalanine and/or with boron compounds enriched with the $^{10}B$ isotope.

14. A 4-magnesiumhalogenide of the protected phenylalanine of formula 2:

[Chem. 1]

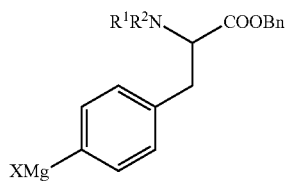

2 where $R^1$ and $R^2$ are benzyl, or $R^1$ is benzyloxycarbonyl, $R^2$ is H; Bn is benzyl; X is Cl or Br as an intermediate product in the production of 4-boronophenylalanine.

15. A protected 4-boronophenylalanine of formula 3:

[Chem. 2]

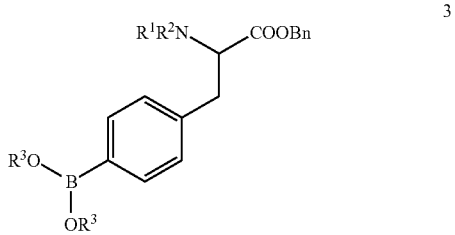

3 where $R^1$ and $R^2$ are benzyl, or $R^1$ is benzyloxycarbonyl, $R^2$ is H; Bn is benzyl; $R^3$ is C1 to C10 alkyl, phenyl, or benzyl
as an intermediate product in the production of 4 boronophenylalanine.

16. The method according to claim 9, wherein the formic acid is used in an amount in a range of 7 to 15% of molar excess.

17. The method according to claim 10, wherein the amount of HCl is in a range of 1 to 2 molar equivalents.

18. The method of claim 12, wherein the one or more ester solvents comprise ethyl acetate.

19. The method of claim 12, wherein the additional purification of the protected 4-boronophenylalanine further comprises purification with active carbon.

\* \* \* \* \*